(12) United States Patent
Wang et al.

(10) Patent No.: US 11,030,818 B1
(45) Date of Patent: Jun. 8, 2021

(54) SYSTEMS AND METHODS FOR PRESENTING VIRTUAL-REALITY INFORMATION IN A VEHICULAR ENVIRONMENT

(71) Applicant: Toyota Motor Engineering & Manufacturing North America, Inc., Plano, TX (US)

(72) Inventors: Timothy Wang, Ypsilanti, MI (US); Roger Akira Kyle, Lewisville, TX (US); Bryan E. Yamasaki, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/687,824

(22) Filed: Nov. 19, 2019

(51) Int. Cl.
*G06T 19/00* (2011.01)
*H04L 29/08* (2006.01)

(52) U.S. Cl.
CPC ............ *G06T 19/006* (2013.01); *H04L 67/12* (2013.01); *G06T 2200/24* (2013.01); *H04L 67/10* (2013.01)

(58) Field of Classification Search
None
See application file for complete search history.

(56) References Cited

U.S. PATENT DOCUMENTS

| 9,715,764 | B2 | 7/2017 | Alaniz et al. | |
|---|---|---|---|---|
| 2007/0156540 | A1 | 7/2007 | Koren et al. | |
| 2017/0103571 | A1* | 4/2017 | Beaurepaire | G01C 21/3667 |
| 2017/0343375 | A1* | 11/2017 | Kamhi | G01C 21/3407 |
| 2018/0339715 | A1* | 11/2018 | Sweeney | A61M 21/00 |
| 2019/0017839 | A1 | 1/2019 | Eyler et al. | |
| 2019/0019329 | A1 | 1/2019 | Eyler et al. | |

FOREIGN PATENT DOCUMENTS

| EP | 3456574 A1 | 3/2019 |
|---|---|---|
| WO | 2007017596 A2 | 2/2007 |

OTHER PUBLICATIONS

BMW Accenture Web Page, found at https://www.accenture.com/us-en/success-bmw-digital-transformation-augmented-reality , in 7 pages.

(Continued)

*Primary Examiner* — Yi Wang
(74) *Attorney, Agent, or Firm* — Christopher G. Darrow; Darrow Mustafa PC

(57) ABSTRACT

Systems and methods for presenting virtual-reality information in a vehicular environment are disclosed herein. One embodiment receives, at a first vehicle, a set of presentation attributes for a second vehicle that is in an external environment of the first vehicle, the set of presentation attributes for the second vehicle corresponding to a virtual vehicle that is different from the second vehicle and within a same vehicle category as the second vehicle; and presents to an occupant of the first vehicle, in a virtual-reality space, the second vehicle in accordance with the received set of presentation attributes for the second vehicle while the second vehicle is visible from the first vehicle in the external environment of the first vehicle.

16 Claims, 7 Drawing Sheets

(56) References Cited

OTHER PUBLICATIONS

"Holoride: Virtual Reality Meets the Real World," Jan. 7, 2019, found at https://www.audi.com/en/experience-audi/mobility-and-trends/digitalization/holoride-virtual-reality-meets-the-real-world.html , in 9 pages.
"How is VR Technology Changing Car Shopping Process?", found at https://archer-soft.com/en/blog/how-vr-technology-changing-car-shopping-process , in 8 pages.
"Nissan's freaky AR concept would project friends in your car, make it look sunny outside," found at https://mashable.com/article/nissan-ar-virtual-reality-windshield-display/ , in 17 pages.
"Envisioning the Car of the Future as a Livingroom on Wheels," The New York Times, Jun. 15, 2017, found at https://www.nytimes.com/2017/06/15/automobiles/wheels/driverless-cars-interior.html , in 2 pages.
Screen Capture of Holoride System Implemented in Audi Vehicle, time index 1:33, video found at https://www.youtube.com/watch?v=zwhNeLpk_kU , in 1 page.
Daan Terra, "Virtual Reality in the Automotive Industry," found at https://www.toptal.com/virtual-reality/virtual-reality-in-the-automotive-industry , in 24 pages.
"Toyota C-HR Virtual Reality Car Launch," found at https://zerolight.com/projects/toyota/toyota-c-hr-virtual-reality-car-launch, in 14 pages.
"Volvo Designers Are Driving Around in Mixed-Reality Headsets," May 29, 2019, found at https://www.engadget.com/2019/05/29/volvo-varjo-xr-1-mixed-reality-headset/ , in 11 pages.
Eric Adams, "Drive a Car Like You'd Fly an F-35 With Augmented Reality," found at https://www.wired.com/2017/02/drive-car-like-youd-fly-f-35-augmented-reality/ , in 4 pages.

\* cited by examiner

US 11,030,818 B1

SYSTEMS AND METHODS FOR PRESENTING VIRTUAL-REALITY INFORMATION IN A VEHICULAR ENVIRONMENT

TECHNICAL FIELD

The subject matter described herein generally relates to vehicles and, more particularly, to systems and methods for presenting virtual-reality information in a vehicular environment.

BACKGROUND

Vehicle occupants, particularly during long or repeated trips, sometimes seek engaging forms of entertainment such as movies and video games. As autonomous vehicles are developed and improved, vehicle occupants—including the driver—will have increased opportunities for leisure and entertainment while in transit. Whether a vehicle is manually or autonomously driven, virtual-reality and augmented-reality technologies can provide a wide variety of entertainment options to vehicle occupants.

SUMMARY

An example of a system for presenting virtual-reality information in a vehicular environment is presented herein. The system comprises a virtual-reality display apparatus, one or more processors, and a memory communicably coupled to the one or more processors. The memory stores a communication module including instructions that when executed by the one or more processors cause the one or more processors to receive, at a first vehicle, a set of presentation attributes for a second vehicle that is in an external environment of the first vehicle, the set of presentation attributes for the second vehicle corresponding to a virtual vehicle that is different from the second vehicle and within a same vehicle category as the second vehicle. The memory also stores a scene virtualization module including instructions that when executed by the one or more processors cause the one or more processors to present to an occupant of the first vehicle, via the virtual-reality display apparatus in a virtual-reality space, the second vehicle in accordance with the received set of presentation attributes for the second vehicle while the second vehicle is visible from the first vehicle in the external environment of the first vehicle.

In another embodiment, a method of presenting virtual-reality information in a vehicular environment is disclosed. The method comprises receiving, at a first vehicle, a set of presentation attributes for a second vehicle that is in an external environment of the first vehicle, the set of presentation attributes for the second vehicle corresponding to a virtual vehicle that is different from the second vehicle and within a same vehicle category as the second vehicle. The method also includes presenting to an occupant of the first vehicle, in a virtual-reality space, the second vehicle in accordance with the received set of presentation attributes for the second vehicle while the second vehicle is visible from the first vehicle in the external environment of the first vehicle.

In another embodiment, a method of presenting virtual-reality information in a vehicular environment is disclosed. The method comprises receiving, at a cloud server, a selection of a set of presentation attributes for a first vehicle, the set of presentation attributes for the first vehicle corresponding to a virtual vehicle that is different from the first vehicle and within a same vehicle category as the first vehicle. The method also includes determining, at the cloud server, that a second vehicle is within a predetermined distance from the first vehicle. The method also includes transmitting the set of presentation attributes for the first vehicle from the cloud server to a virtual-reality system in the second vehicle that presents to an occupant of the second vehicle, in a virtual-reality space, the first vehicle in accordance with the set of presentation attributes for the first vehicle.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
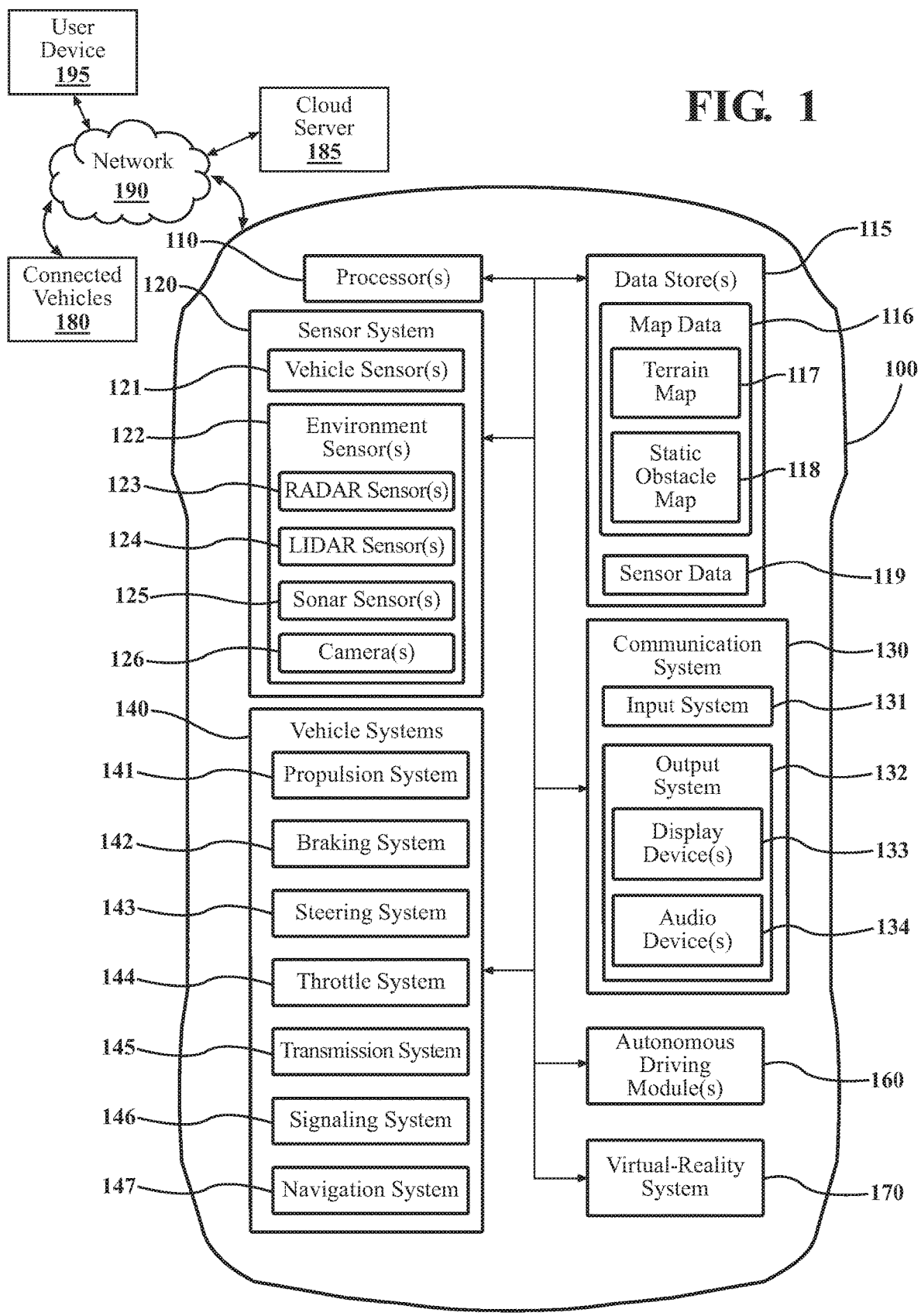
FIG. 1 illustrates one embodiment of a vehicle within which systems and methods disclosed herein may be implemented.

One feature of virtual reality or augmented reality that appeals to some users is the ability to control how they or objects associated with themselves are presented to other users in the virtual-reality or augmented-reality space. In various embodiments described herein, this concept is applied to a vehicular environment. For example, a vehicle owner might have always dreamed of driving a high-performance sports car such as a Lamborghini but cannot afford to buy one. In embodiments, such a vehicle owner might choose to configure his or her inexpensive sedan to look like the coveted Lamborghini to occupants of other nearby vehicles who are viewing the sedan in a virtual-reality or augmented-reality experience. Likewise, the occupants of the other vehicles might choose to configure their respective vehicles to appear, to the original vehicle owner mentioned above, as the occupants of the other vehicles want them to appear, in the virtual-reality or augmented-reality experience. In some embodiments, such an experience can be shared simultaneously among occupants of two or more different vehicles.

In various embodiments, a virtual-reality system in a vehicle receives a set of presentation attributes for another vehicle in the external environment. The set of presentation attributes corresponds to a virtual vehicle that differs from the other vehicle but is within the same vehicle category as the other vehicle. Some common vehicle categories include, without limitation, automobiles, watercrafts (e.g., boats), and aerial vehicles. Having received the set of presentation attributes for the other vehicle, the system presents to an occupant of the original vehicle mentioned above, via a virtual-reality display apparatus in a virtual-reality space, the other vehicle in accordance with the received set of presentation attributes while the other vehicle is visible in the external environment of the original vehicle. For example, the other vehicle might be a white Honda Accord traveling nearby in an adjacent lane. The owner or another person associated with the white Honda Accord has selected a virtual-vehicle profile with an associated set of presentation attributes corresponding to a red Chevrolet Corvette Stingray. The virtual-reality system in the original vehicle receives the set of presentation attributes for the other vehicle from a cloud server or from the other vehicle itself. The virtual-reality system in the original vehicle presents the other vehicle (the white Honda Accord) to the occupant of the original vehicle in accordance with the received set of presentation attributes—as a red Corvette—in the virtual-reality space.

In some embodiments, a user has extensive control over how his or her vehicle is presented to other participants in a virtual-reality or augmented-reality space. In one embodiment, a user can select a virtual-vehicle profile from a large database or library of such profiles, each virtual-vehicle profile including a set of presentation attributes for the applicable virtual vehicle, such as model year, make, model, one or more colors, a custom logo, custom detailing, and one or more advertising messages or slogans. In some embodiments, a user can further customize the set of presentation attributes for a selected virtual vehicle using a user-interface application that includes a graphical user interface (GUI) with drawing tools, etc. In some embodiments, the virtual-reality experience includes virtualized sounds, and the presentation attributes in the selected virtual-vehicle profile can include one or more sounds associated with the selected virtual vehicle (e.g., engine noises, etc.).

In some embodiments, the virtual-reality system, in addition to presenting other vehicles in accordance with their respective received sets of presentation attributes, presents, to a vehicle occupant, a virtual interior passenger compartment. For example, a vehicle owner or other user may configure the vehicle's instrument panel and other interior-design features, in the virtual-reality or augmented-reality space, to appear in accordance with a selected profile (e.g., a particular make and model of sports car or a style/theme called "art deco") or in accordance with other customized personal preferences. In some embodiments, the virtual interior passenger compartment can include one or more virtual occupants (e.g., people, animals, or other entities). A virtual occupant can be an actual occupant whose appearance is altered or replaced entirely in the virtual-reality or augmented-reality space, or a virtual occupant can be entirely simulated (fictional). In one embodiment, a user can configure a virtual occupant look like a celebrity.

Referring to FIG. 1, an example of a vehicle 100, in which systems and methods disclosed herein can be implemented, is illustrated. The vehicle 100 can include a virtual-reality (VR) system 170 or components and/or modules thereof. To simplify this description, the term "virtual reality" (or "VR") is used broadly herein to encompass both "augmented reality" (or "AR") and virtual reality. These terms are explained further below.

As those skilled in the art are aware, "augmented reality" or "AR" sometimes refers to technologies in which two-dimensional (2D) or three-dimensional (3D) video data (e.g., from one or more cameras) corresponding to a scene in the real world is overlaid or annotated in part with virtual (e.g., computer-generated) content in real time. One simple, familiar example of AR are the yellow line-of-scrimmage and first-down lines that are sometimes artificially overlaid on the playing field in a televised American football game. In the context of the embodiments described herein, altering the visual appearance and, in some embodiments, the sound of one or more other vehicles in the external environment while leaving everything else in the external environment, as captured by a video camera, unaltered is another example of AR. As mentioned above, however, for simplicity, this kind of embodiment is herein included under the general heading of "virtual reality" or "VR."

As those skilled in the art are also aware, "virtual reality" or "VR" sometimes refers to technologies in which 2D or 3D video data not necessarily corresponding with the real world in real time is presented in an immersive way that heightens the realism of the experience for the user. For example, some VR systems include a VR headset or goggles that the user wears and components or devices that create the illusion of motion and stimulate one or more of a user's senses.

In short, though various embodiments described herein may, in the VR space, alter or augment the environment external to a vehicle (and, in some embodiments, the interior passenger compartment of the vehicle) to varying degrees from minimal (e.g., only other vehicles in the external environment) to total or nearly total (e.g., an immersive video-game-like experience), all of these different embodiments are herein included under the general heading of "virtual reality" or "VR."

As used herein, a "vehicle" is any form of motorized transport. In one or more implementations, the vehicle 100 can be an automobile. In some implementations, the vehicle 100 may be any other form of motorized transport, including watercrafts (e.g., boats) and aerial vehicles (airplanes, helicopters, hovercrafts, etc.). In some embodiments, vehicle 100 is capable of operating in a semi-autonomous or fully autonomous mode. The vehicle 100 can include the VR system 170 or capabilities to support or interact with the VR system 170 and thus benefits from the functionality discussed herein. While arrangements will be described herein with respect to automobiles, it will be understood that implementations are not limited to automobiles. Instead, implementations of the principles discussed herein can be applied to any kind of vehicle, as discussed above. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including VR system 170. While the various elements are shown as being located within the vehicle 100 in FIG. 1, it will be understood that one or more of these elements can be located external to the vehicle 100. Further, the elements shown may be physically separated by large distances. As shown in FIG. 1, vehicle 100 may communicate with one or more connected vehicles 180, a cloud server 185, and/or one or more user devices 195 via network 190.

Some of the possible elements of the vehicle 100 are shown in FIG. 1 and will be described in connection with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Figure 2:
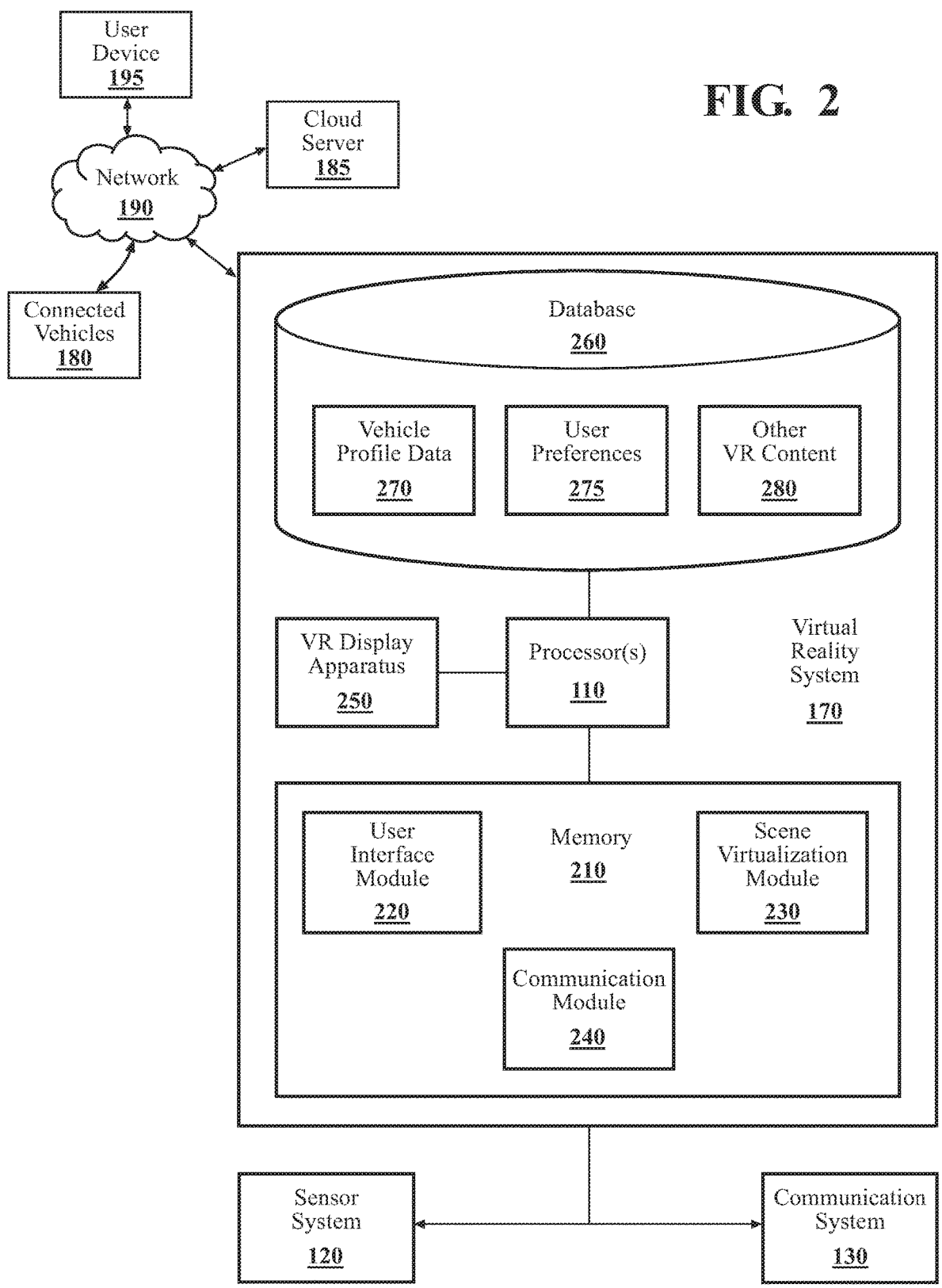
FIG. 2 illustrates one embodiment of a virtual reality system.

Referring to FIG. 2, one embodiment of the VR system 170 of FIG. 1 is further illustrated. In this particular embodiment, VR system 170 is shown as including one or more processors 110 from the vehicle 100 of FIG. 1. In general, the one or more processors 110 may be a part of VR system 170, VR system 170 may include one or more separate processors from the one or more processors 110 of the vehicle 100, or VR system 170 may access the one or more processors 110 through a data bus or another communication path, depending on the embodiment.

In one embodiment, memory 210 stores a user interface module 220, a scene virtualization module 230, and a communication module 240. The memory 210 is a random-access memory (RAM), read-only memory (ROM), a hard-disk drive, a flash memory, or other suitable memory for storing the modules 220, 230, and 240. The modules 220, 230, and 240 are, for example, computer-readable instructions that when executed by the one or more processors 110, cause the one or more processors 110 to perform the various functions disclosed herein.

As shown in FIG. 2, VR system 170 can communicate with one or more connected vehicles 180, a cloud server 185, and/or one or more user devices 195 via network 190. In some embodiments, VR system 170 also communicates and interacts with sensor system 120 and communication system 130 of vehicle 100 (refer to FIG. 1). Also, in some embodiments, a user associated with vehicle 100 uses a user device 195 to communicate with cloud server 185, vehicle 100, or both. Examples of a user device 195 include, without limitation, a smartphone, desktop computer, laptop computer, or tablet computer.

In various embodiments, VR system 170 receives video data from one or more cameras 126 (refer to FIG. 1) and processes the incoming video data in real time to present an at least partially virtualized experience to one or more vehicle occupants who are wearing a VR display apparatus 250 (e.g., VR headset, goggles, or glasses). In some embodiments, the VR display apparatus 250 includes audio capabilities in addition to video capabilities (e.g., circuitry for providing audio and a set of headphones). In embodiments that support sound, VR system 170 can also receive input from one or more microphones in the internal and/or external environment of vehicle 100 (not shown in FIG. 2) so that a user can hear ambient sounds in the physical environment.

In some embodiments, a user can hear ambient sounds in combination with sounds artificially added by VR system 170 in the VR space.

In some embodiments, a driver or operator of vehicle 100, one or more other occupants of vehicle 100, or both can participate in a VR experience. In those embodiments, the scene that VR system 170 presents to the driver in real time is clear and accurate enough (e.g., high enough in resolution and sufficiently accurate in its depiction of depth) to permit the driver to operate vehicle 100 safely, even at highway speeds, while wearing a VR display apparatus 250. In other embodiments, only occupants of vehicle 100 other than the driver are permitted to participate in a VR experience.

In one embodiment, a large library of virtual-vehicle profiles, each of which includes a set of presentation attributes for the applicable virtual vehicle, is stored in cloud server 185. VR system 170 can, in some embodiments, download virtual-vehicle profiles as needed and store them locally as vehicle profile data 270. In other embodiment, a large library of virtual-vehicle profiles can be stored locally in vehicle 100 as vehicle profile data 270 and updated from time to time via cloud server 185.

In some embodiments, a user (e.g., a vehicle owner or other authorized person) selects a virtual-vehicle profile for a vehicle 100 by communicating with cloud server 185 using a user device 195. In other embodiments, the user does this by communicating with VR system 170 in vehicle 100 using a user device 195. In other embodiments, the user does this via a user interface that is integrated with vehicle 100 (e.g., a touchscreen interface). In still other embodiments, a user can select a virtual-vehicle profile and choose other options for VR system 170 via user-interface features included in a VR display apparatus 250.

User interface module 220 generally includes instructions that cause the one or more processors 110 to receive, from a person associated with vehicle 100 (e.g., an owner or other authorized user), a selection of a set of presentation attributes for the vehicle 100. As mentioned above, the user can interact with user interface module 220 via a user device 195 or via built-in user-interface hardware (e.g., a touchscreen interface) integrated with vehicle 100. The virtual-vehicle profile for vehicle 100 selected by the user can be stored in user preferences 275. In some embodiments, user interface module 220, via communication module 240, uploads the user's selected choice of virtual-vehicle profile to a cloud server 185. As discussed further below, in some embodiments, cloud server 185 can transmit the set of presentation attributes for a given vehicle 100 to other vehicles that cloud server 185 determines are near vehicle 100.

The set of presentation attributes corresponds to a virtual vehicle that is different from vehicle 100 but falls within the same vehicle category. For example, in one embodiment, vehicle 100 is an automobile. Thus, vehicle 100 falls within the category "automobiles." In this embodiment, the set of presentation attributes corresponds to a virtual automobile that is a different kind of automobile (e.g., different make, model, model year, etc.) than vehicle 100. Similarly, if vehicle 100 is a watercraft, it falls within the category of "watercrafts," and the set of presentation attributes thus corresponds to a virtual watercraft that is a different kind of watercraft than vehicle 100. If vehicle 100 is an aerial vehicle, it falls within the category of "aerial vehicles," and the set of presentation attributes thus corresponds to a virtual aerial vehicle that is a different kind of aerial vehicle than vehicle 100. The above pattern applies to any other category of vehicles.

The user's selected set of presentation attributes for vehicle 100 is ultimately communicated, by cloud server 185 or by vehicle 100 itself, to one or more nearby vehicles that are equipped with a VR system comparable to or compatible with VR system 170. The VR system in the other vehicles can use the received set of presentation attributes to present vehicle 100, in VR space, to one or more occupants of the other vehicles in accordance with the received set of presentation attributes (i.e., in accordance with the virtual vehicle chosen by the user associated with vehicle 100).

In the discussion of user interface module 220 above, the point of view was a vehicle 100 for whom a user selects a set of presentation attributes for vehicle 100, the selected set of presentation attributes thereafter being transmitted to other vehicles nearby in the external environment of vehicle 100. In the discussion of communication module 240 and scene virtualization module 230 that follows, the point of view switches to a vehicle 100 that receives a set of presentation attributes for another vehicle nearby in the external environment of vehicle 100. This change of viewpoint results from each vehicle 100 being capable of transmitting its own selected set of presentation attributes and also receiving sets of presentation attributes for other vehicles. This makes possible a mutual or shared VR experience in which the occupants of two or more vehicles participate simultaneously.

Communication module 240 generally includes instructions that cause the one or more processors 110 to receive, at vehicle 100, a set of presentation attributes for another vehicle that is in the external environment of vehicle 100. As explained above, the set of presentation attributes for the other vehicle corresponds to a virtual vehicle that is different from the other vehicle but within the same vehicle category as the other vehicle.

In some embodiments, communication module 240 receives the set of presentation attributes for the other vehicle from cloud server 185. In those embodiments, cloud server 185 determines that the other vehicle is within a predetermined distance of vehicle 100 (e.g., within a distance from which the other vehicle would likely be visible from vehicle 100) and transmits the set of presentation attributes for the other vehicle to vehicle 100 via network 190. In some embodiments, cloud server 185 transmits the set of presentation attributes for the other vehicle to vehicle 100 in anticipation of the other vehicle coming within a predetermined distance from vehicle 100 within a relatively short period (e.g., a few seconds to a few minutes). Other functions performed by cloud server 185 in connection with VR system 170 in various embodiments are discussed below.

In other embodiments, communication module 240 receives the set of presentation attributes for the other vehicle from the other vehicle via a vehicle-to-vehicle (V2V) communication link using a technology such as Bluetooth Low Energy (BLE) or Dedicated Short-Range Communication (DSRC). This can occur, in some embodiments, in response to vehicle 100 detecting the presence of the other vehicle within a predetermined distance (e.g., based on a frequently broadcast signal from the other vehicle that includes identifying information for the other vehicle, as discussed further below) and communicating with the other vehicle to request or otherwise trigger transmission of the set of presentation attributes for the other vehicle to vehicle 100. In yet other embodiments, the other vehicle may first detect vehicle 100 and "push" the set of presentation attributes for the other vehicle to vehicle 100 (i.e., to communication module 240) via V2V communication. In some embodiments, the V2V communications can be of the multi-hop variety rather than direct, where necessary.

Note that in some of the embodiments discussed above, communication module 240 also transmits a selected set of presentation attributes for a vehicle 100 to cloud server 185, one or more other vehicles, or both.

Scene virtualization module 230 generally includes instructions that cause the one or more processors 110 to present to an occupant of vehicle 100, via a VR display apparatus 250 in a VR space, another vehicle in accordance with the received set of presentation attributes for the other vehicle while the other vehicle is visible from vehicle 100 in the external environment of the vehicle 100. In this context, "visible" means (1) that the scene virtualization module 230 of vehicle 100 is able to detect the other vehicle, (2) that the occupant of vehicle 100 is wearing a VR display apparatus 250 (is participating in the VR space), and (3) that the other vehicle is currently within the occupant's field of view in the VR display apparatus 250. When one or more of these three conditions is not met, there is, of course, no need for scene virtualization module 230 to present (display) the other vehicle in the VR space.

One aspect of scene virtualization module 230 is real-time analysis of video data. In some embodiments, this involves segmenting video data received from one or more cameras 126 using techniques such as semantic segmentation and instance segmentation. For example, the video data can be initially segmented into two broad classes such as "interior passenger compartment" and "external environment." The "external environment" encompasses whatever lies outside vehicle 100. Objects detected within the "external environment" can be more finely categorized as, e.g., "building," "tree," "grass," etc. Of particular interest to virtualization module 230 is any object in the external environment labeled as a "vehicle."

Another aspect of scene virtualization module 230 is modifying video data in real time based on the analysis explained above. If scene virtualization module 230 has a set of presentation attributes corresponding to a particular vehicle detected and identified in the external environment of vehicle 100, scene virtualization module 230 can present that vehicle in accordance with its received set of presentation attributes to one or more occupants of vehicle 100 who are currently engaged in the VR space. In some embodiments, scene virtualization module 230 does this by replacing the pixels associated with the other vehicle with different pixels in accordance with the applicable set of presentation attributes. If the set of presentation attributes for the other vehicle includes one or more sounds, scene virtualization module 230 can also play, in VR space, the sound(s) to the participating occupant(s) of vehicle 100.

In some embodiments, scene virtualization module 230 identifies particular vehicles in the external environment based on location and identification information received from cloud server 185. For example, in such an embodiment, cloud server 185, in transmitting a set of presentation attributes for a vehicle to nearby vehicles, can include identification and location information for the subject vehicle along with the set of presentation attributes. In other embodiments, connected vehicles frequently broadcast a signal that reaches nearby vehicles within a predetermined radius. These signals can be broadcast using a short-range wireless communication technology such as BLE or DSRC. The broadcast signals include a unique identifier for each vehicle (e.g., its vehicle identification number or "VIN"). Scene virtualization module 230 can match the identifying information in such a broadcast signal with corresponding identifying information that accompanies a received set of presentation attributes.

In some embodiments, scene virtualization module 230, in addition to presenting one or more other vehicles in accordance with their respective sets of presentation attributes, presents, to an occupant of vehicle 100 in the VR space, at least one additional virtual element in the external environment of vehicle 100. An additional virtual element could include, for example, an altered or entirely fictitious entity (person, animal, mythical creature), altered or entirely fictitious buildings, plants, objects in the sky, etc. In short, such an added virtual element can be anything that scene virtualization module 230 adds to or alters/replaces in the external environment of vehicle 100 in addition to other vehicles presented in accordance with their respective sets of presentation attributes. In one embodiment, scene virtualization module 230 replaces the entire external environment of vehicle 100 with virtualized content to create an immersive video-game-like experience for the vehicle occupant. In general, scene virtualization module 230 can retrieve VR content from other VR content 280 stored in database 260.

In still other embodiments, scene virtualization module 230, in addition to presenting one or more other vehicles in accordance with their respective sets of presentation attributes, presents, to an occupant of vehicle 100 in the VR space, a virtual interior passenger compartment for vehicle 100. A user can select a desired look/style of interior passenger compartment via user interface module 220 in a manner similar to selecting a virtual-vehicle profile, and scene virtualization module 230 can render the interior passenger compartment of vehicle 100, in the VR space, in accordance with the user's preferences. For example, a user might decide that she wants the interior of her automobile to look, in VR space, like the interior of an MG Midget, including gauges and instrument panel. In some embodiments, the user can control one or more functions in vehicle 100 through the use of VR display apparatus 250 in conjunction with user interface module 220. For example, a user, in one embodiment, might turn down the volume of the sound system through a hand or head gesture detected by user interface module 220.

In some embodiments, the concept of a virtual interior passenger compartment can be extended to include one or more virtual vehicle occupants. As mentioned above, in one embodiment, scene virtualization module 230, in the VR space, alters or replaces an actual vehicle occupant with a virtual occupant of the user's choosing. In another embodiment, scene virtualization module 230 presents, in the VR space, an entirely fictitious (imaginary) occupant—perhaps to keep the driver company on a long drive. In one embodiment, a virtual occupant of vehicle 100 looks (and, in some embodiments, sounds) like a celebrity. Like other VR content, the VR content that scene virtualization module 230 draws from in connection with the virtual-occupants feature can be stored in other VR content 280 in database 260.

In some embodiments, the VR systems 170 in two or more vehicles can simultaneously present, to their respective occupants in the VR space, the other vehicles in accordance with their respective sets of presentation attributes. That is, the virtualization of the appearance and, in some embodiments, sound of other vehicles can be mutual among a plurality of vehicles that are in close enough proximity to be "visible" to one another, as discussed above. To cite a simple example, User A in Vehicle A (a 2011 Volkswagen Golf) selects a virtual-vehicle profile based on a 2019 Toyota 86 TRD SE (M6). User B in Vehicle B (a 2014 Honda Civic) selects a virtual-vehicle profile based on a 2019 BMW i8 Coupe. Vehicle A and Vehicle B, in this example, end up being, for a time, in relatively close proximity to each other while traveling along an expressway, and both User A and User B are participating in a VR experience (e.g., both users area wearing a VR display apparatus 250 and have opted in to this kind of experience). The VR system 170 in each vehicle has become aware of the other vehicle, and each vehicle has received the other vehicle's corresponding set of presentation attributes, as discussed above. The scene virtualization module 230 in Vehicle A presents, to User A in the VR space, Vehicle B as a 2019 BMW i8 Coupe with whatever customizations (logo, advertising messages, detailing, etc.) User B has configured. Simultaneously, the scene virtualization module 230 in Vehicle B presents, to User B in the VR space, Vehicle A as a 2019 Toyota 86 TRD SE (M6) with whatever customizations (logo, advertising messages, detailing, etc.) User A has configured. In some embodiments, this kind of mutual or shared VR experience can be generalized to N vehicles, where N is greater than or equal to two.

In some embodiments, a user in a vehicle 100 can choose to override, at least in part, the set of presentation attributes received for another vehicle in the external environment. For example, a user might not like another vehicle owner's bright-purple-dragster virtual-vehicle profile. In such a case, the user can, via user interface module 220, instruct scene virtualization module 230 to stop virtualizing the other vehicle's appearance and/or sound. In some embodiments, such adjustments can be made conveniently via VR display apparatus 250. In one embodiment, scene virtualization module 230 causes the other vehicle to revert to its actual appearance and sound in reality. In another embodiment, the user in vehicle 100 can choose to modify one or more specific aspects of the other vehicle's virtual-vehicle profile to suit his or her personal preferences. In some embodiments, this is done conveniently via a speech-recognition-based user interface. For example, the user might say, "I don't like that color of green on that virtual Mustang over there [user points finger]. Please change it to dark gray." Scene virtualization module 230 responds, via user interface module 220, to the command by changing the color of the nearby vehicle to dark gray.

Figure 3:
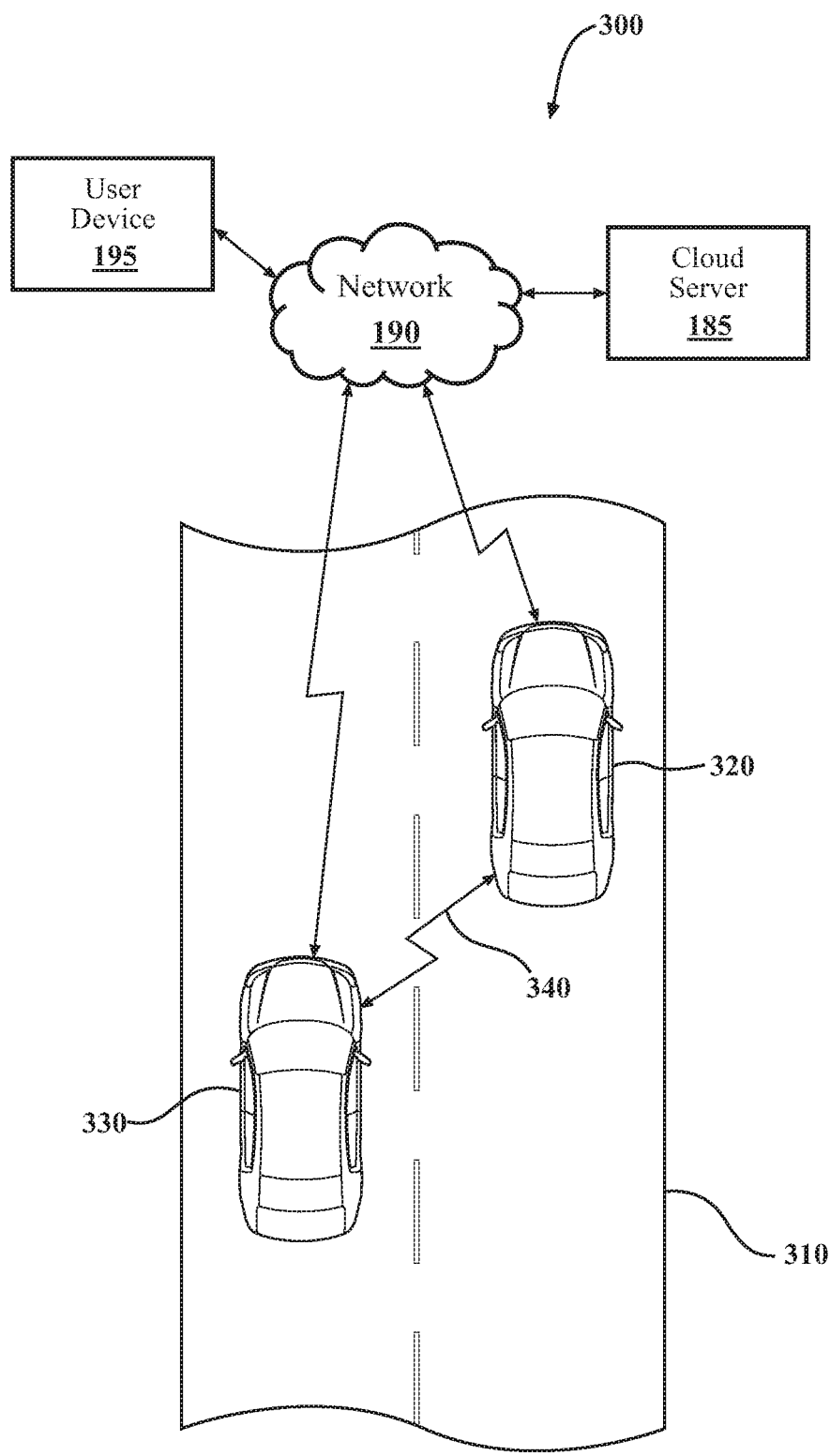
FIG. 3 is a diagram of an architecture in which one or more vehicular virtual reality systems can be deployed, in accordance with an illustrative embodiment of the invention.

FIG. 3 is a diagram of an architecture 300 in which one or more vehicular virtual reality systems 170 can be deployed, in accordance with an illustrative embodiment of the invention. In FIG. 3, a section of roadway 310 is depicted along which two vehicles, vehicle 320 and vehicle 330, are traveling in adjacent lanes. Each of vehicle 320 and vehicle 330 includes a VR system 170 (not shown in FIG. 3), as discussed above. As shown in FIG. 3, in some embodiments, vehicle 320 and vehicle 330 communicate with cloud server 185 over wireless network links to network 190. In some embodiments, network 190 may include the Internet. As also depicted in FIG. 3, a user can use a user device 195 to communicate with cloud server 185 or a vehicle (vehicle 320 or vehicle 330) with which he or she is associated, or both, depending on the particular embodiment. In some embodiments, vehicle 320 and vehicle 330 can communicate directly with each other via a V2V communication link 340. In some situations, the connection may be via a multi-hop V2V communication link (not shown in FIG. 3) involving other vehicles as intermediate relay nodes. In some embodiments, vehicle 320 and vehicle 330 can communicate with each other or with other vehicles via V2V communication links, and the vehicles can also communicate with cloud server 185. Illustrative embodiments based on the architecture shown in FIG. 3 are discussed below in connection with FIGS. 4 and 5.

Figure 4:
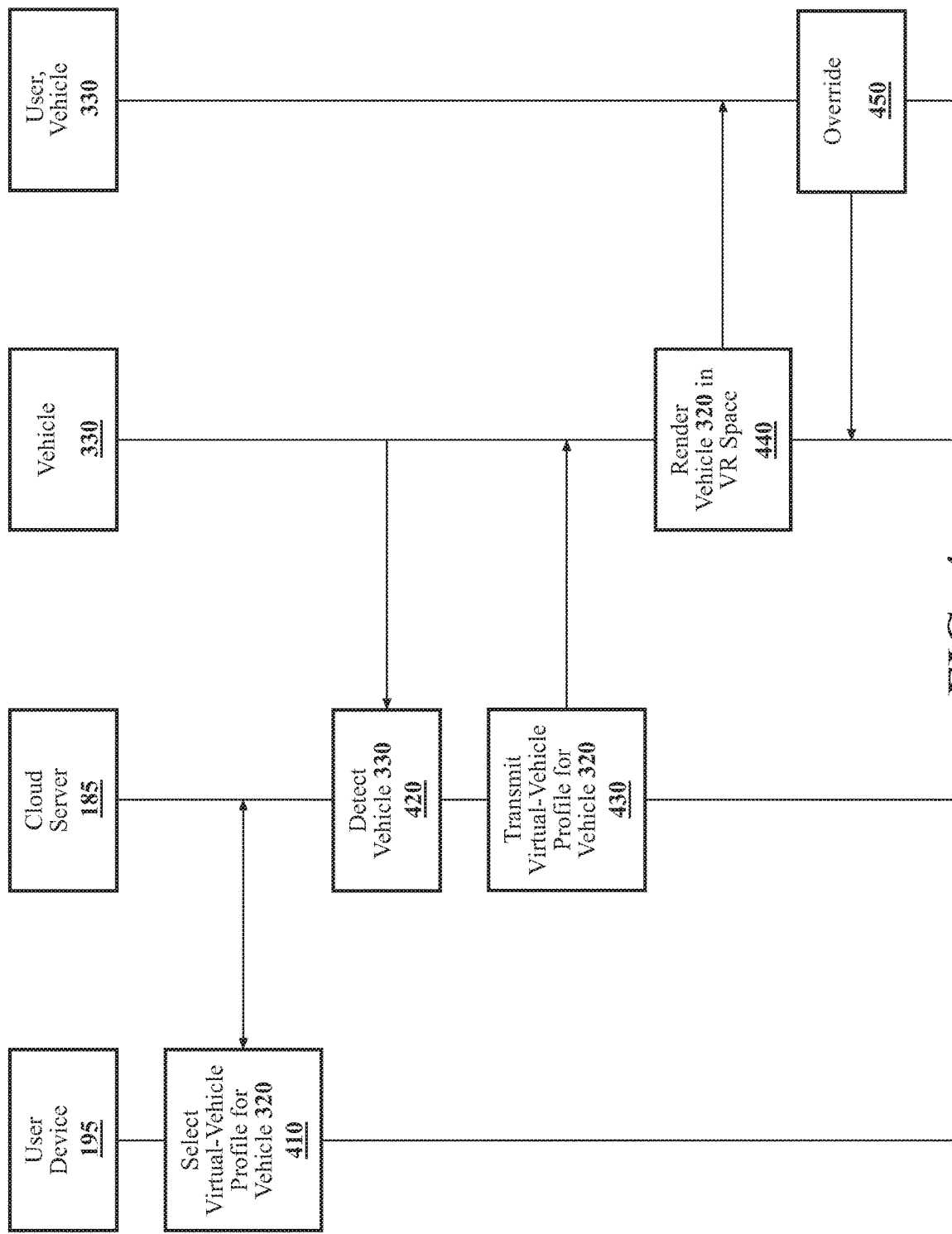
FIG. 4 is a system flow diagram for the architecture shown in FIG. 3, in accordance with an illustrative embodiment of the invention.

FIG. 4 is a system flow diagram for the architecture shown in FIG. 3, in accordance with an illustrative embodiment of the invention. In the embodiment depicted in FIG. 4, a user associated with vehicle 320 communicates with cloud server 185 using a user device 195. In one embodiment, a user-interface application runs locally on the user device 195, and the user-interface application communicates with cloud server 185 as needed. In a different embodiment, cloud server 185 hosts a Web application that provides the user interface, and user device 195 runs a Web browser to access the user-interface features. In either embodiment, at block 410, the user associated with vehicle 320 selects a virtual-vehicle profile (and corresponding set of presentation attributes) for vehicle 320. That selection is received and saved at cloud server 185.

At block 420, cloud server 185 detects that vehicle 330 is within a predetermined distance (e.g., a few hundred meters) of vehicle 320. In this embodiment, vehicles frequently report their positions (e.g., as GPS coordinates) to cloud server 185 to enable cloud server 185 to perform the function of distributing sets of presentation attributes to vehicles near a given vehicle. At block 430, cloud server 185 transmits the virtual-vehicle profile for vehicle 320, including its associated set of presentation attributes, to the VR system 170 of vehicle 330. As discussed above, in some embodiments, cloud server 185 can also transmit, to the VR system 170 of vehicle 330, information regarding the location of vehicle 320 to aid vehicle 330 in identifying vehicle 320 in the external environment. Cloud server 185 can transmit updated location information as needed.

At block 440, scene virtualization module 230 in the VR system 170 of vehicle 330 presents, to at least one occupant of vehicle 330 ("user, vehicle 330" in FIG. 4) in VR space, vehicle 320 in accordance with the received set of presentation attributes for vehicle 320.

In some embodiments, the user (occupant) of vehicle 330 may optionally override at least a portion of the set of presentation attributes for vehicle 320 via the user interface module 220 in the VR system 170 of vehicle 330, as discussed above.

Figure 5:
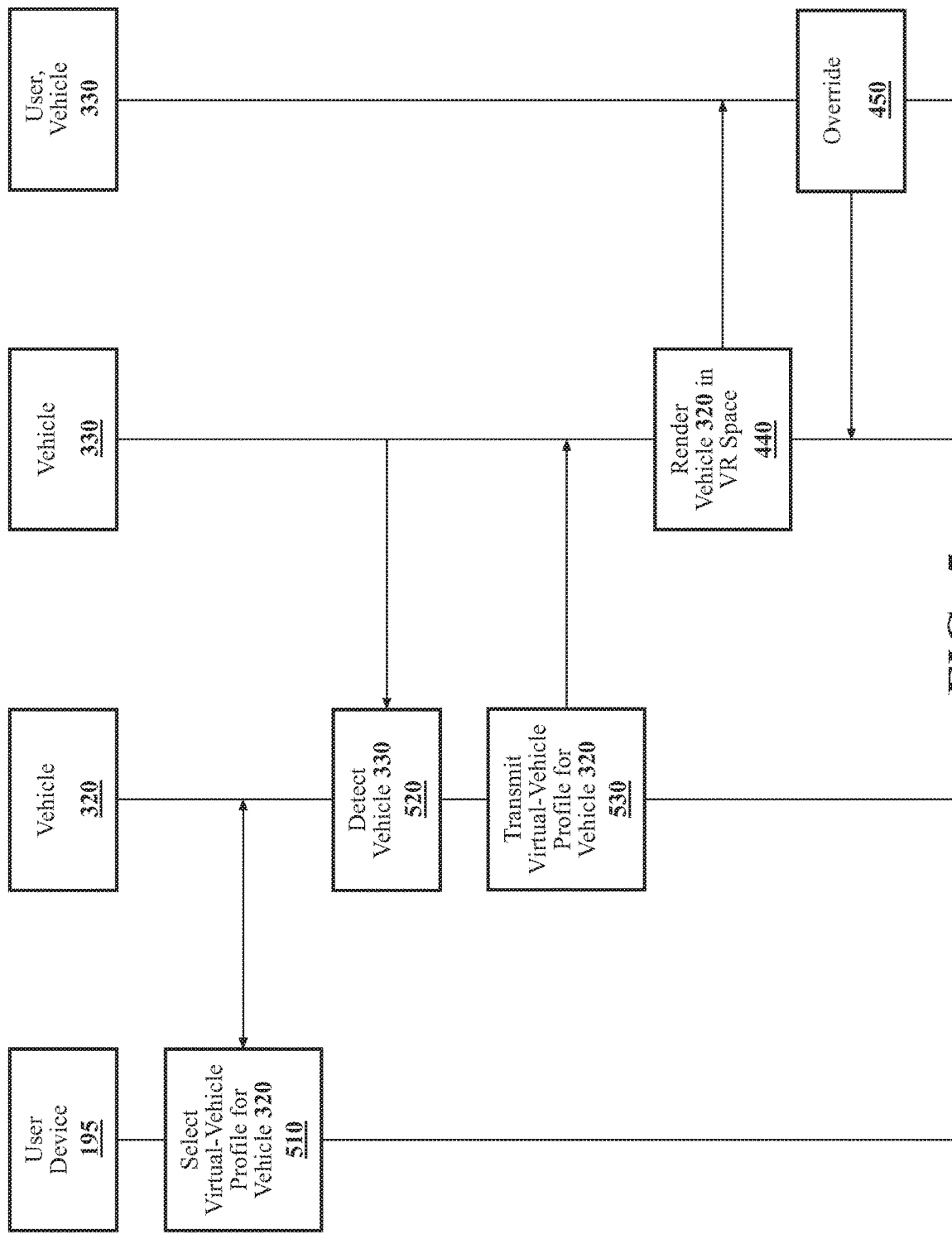
FIG. 5 is a system flow diagram for the architecture shown in FIG. 3, in accordance with another illustrative embodiment of the invention.

FIG. 5 is a system flow diagram for the architecture shown in FIG. 3, in accordance with another illustrative embodiment of the invention. FIG. 5 illustrates an embodiment that does not include a cloud server 185. Instead, this embodiment features V2V communication among participating vehicles. In the embodiment depicted in FIG. 5, a user associated with vehicle 320 communicates with the user interface module 220 of the VR system 170 in vehicle 320 using a user device 195. In one embodiment, a user-interface application runs locally on the user device 195, and the user-interface application communicates with the user interface module 220 in vehicle 320 as needed. In a different embodiment, user interface module 220 hosts a Web application that provides the user interface, and user device 195 runs a Web browser to access the user-interface features. In either embodiment, at block 510, the user associated with vehicle 320 selects a virtual-vehicle profile including a set of presentation attributes for vehicle 320. That selection is received and saved locally in database 260 of vehicle 320 (e.g., in user preferences 275).

At block 520, vehicle 320 detects that vehicle 330 is within a predetermined distance (e.g., a few hundred meters) of vehicle 320. In this embodiment, vehicles frequently broadcast, via V2V communication links, information to one another that includes identification data (e.g., a VIN). At block 530, communication module 240 in the VR system 170 of vehicle 320 transmits the virtual-vehicle profile for vehicle 320, including its associated set of presentation attributes, to the VR system 170 of vehicle 330. In a variation of block 520, vehicle 330 detects vehicle 320 and requests, from vehicle 320, the set of presentation attributes associated with vehicle 320, or some other form of handshaking between vehicle 320 and vehicle 330 results in vehicle 320 transmitting its selected set of presentation attributes to vehicle 330.

At block 440 in FIG. 5, scene virtualization module 230 in the VR system 170 of vehicle 330 presents, to at least one occupant of vehicle 330 ("user, vehicle 330" in FIG. 5) in VR space, vehicle 320 in accordance with the received set of presentation attributes for vehicle 320.

As discussed above in connection with FIG. 4, in some embodiments, the user (occupant) of vehicle 330 may optionally override at least a portion of the set of presentation attributes for vehicle 320 via the user interface module 220 in the VR system 170 of vehicle 330, as discussed above. This is represented in block 450 in FIG. 5.

FIGS. 4 and 5 are only two examples of specific configurations of the architecture 300 shown in FIG. 3. In other embodiments, for example, the vehicles employ V2V communication, but the vehicles also communicate with cloud server 185 to save or back up user configuration options (e.g., the choice of a virtual-vehicle profile for a given vehicle), obtain additional virtual-vehicle profiles from a database of such profiles, obtain information about nearby vehicles and their positions, or for other purposes.

Figure 6:
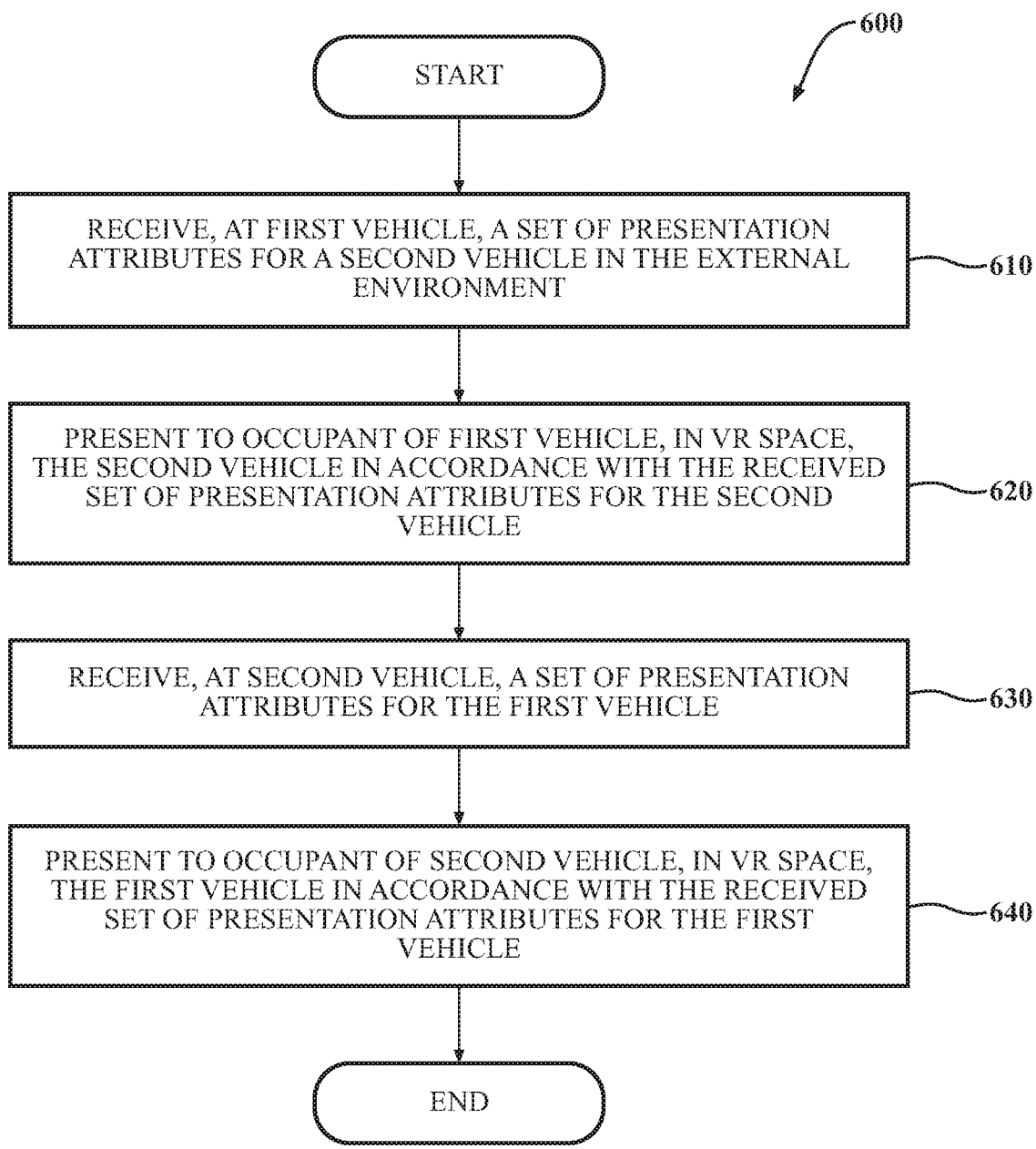
FIG. 6 is a flowchart of a method of presenting virtual-reality information in a vehicular environment, in accordance with an illustrative embodiment of the invention.

FIG. 6 is a flowchart of a method 600 of presenting virtual-reality information in a vehicular environment, in accordance with an illustrative embodiment of the invention. Method 600 will be discussed from the perspective of VR system 170 in FIG. 2. While method 600 is discussed in combination with VR system 170, it should be appreciated that method 600 is not limited to being implemented within VR system 170, but VR system 170 is instead one example of a system that may implement method 600. Note that blocks 630 and 640, which pertain to a mutual VR experience, are not necessarily present in every embodiment.

At block 610, the communication module 240 in the VR system 170 of vehicle 100 receives a set of presentation attributes for another vehicle in the external environment of vehicle 100. As discussed above, the set of presentation attributes for the other vehicle corresponds to a virtual vehicle that is different from the other vehicle and within the same vehicle category (e.g., "automobiles," "watercrafts," or "aerial vehicles") as the other vehicle. As also discussed above, communication module 240 can receive the set of presentation attributes for the other vehicle from a cloud server 185 via network 190 or from the other vehicle via a V2V communication link.

At block 620, scene virtualization module 230 presents to an occupant of vehicle 100, via a VR display apparatus 250 in a VR space, the other vehicle in accordance with the received set of presentation attributes for the other vehicle while the other vehicle is visible from vehicle 100 in the external environment of vehicle 100. As discussed above, the set of presentation attributes can include characteristics such as model year, make, model, one or more colors, a custom logo, custom detailing, one or more advertising messages, and one or more sounds.

At block 630, the communication module 240 in the VR system 170 of the "other vehicle" discussed above in connection with blocks 610 and 620 receives a set of presentation attributes for the vehicle 100 discussed above in connection with blocks 610 and 620. The set of presentation attributes for vehicle 100 corresponds to a virtual vehicle that is different from vehicle 100 and within the same vehicle category as vehicle 100.

At block 640, the scene virtualization module 230 in the VR system 170 of the "other vehicle" discussed above in connection with blocks 610 and 620 presents to an occupant of the other vehicle, in the VR space, the vehicle 100 discussed above in connection with blocks 610 and 620 in accordance with the received set of presentation attributes for vehicle 100 while vehicle 100 is visible from the other vehicle in the external environment of the other vehicle.

Note that in an embodiment in which blocks 610, 620, 630, and 640 are performed, the VR experience is mutual or shared between occupants of different vehicles at the same time, as discussed above. In other embodiments, only blocks 610 and 620 of method 600 are performed because an occupant of another nearby vehicle has not "opted in" to the VR experience (i.e., no occupant of another nearby vehicle is currently wearing a VR display apparatus 250 to participate in a mutual VR experience).

In other embodiments, additional features can be added to method 600 singly or in combination with one another. For example, in one embodiment, scene virtualization module 230 in the VR system 170 of vehicle 100 presents to an occupant of vehicle 100, in the VR space, at least one additional virtual element in the external environment of vehicle 100 besides the other vehicle, as presented in accordance with the received set of presentation attributes for the other vehicle. As discussed above, the virtualization of objects in the external environment surrounding vehicle 100 can be minimal (e.g., only other vehicles), or the virtualization can be extensive or even total, depending on the embodiment.

In another embodiment discussed above, scene virtualization module 230 in the VR system 170 of vehicle 100 presents to an occupant of vehicle 100, in the VR space, a virtual interior passenger compartment for vehicle 100. In some embodiments, the virtual interior passenger compartment can include one or more virtual occupants of vehicle 100. As also discussed above, in some embodiments, scene virtualization module 230 in the VR system 170 of vehicle 100 can override at least a portion of the set of presentation attributes received for another vehicle in response to a command issued to user interface module 220 from an occupant of vehicle 100.

In another embodiment discussed above, user interface module 220 in the VR system 170 of vehicle 100 receives, from a person associated with vehicle 100, a selection of a set of presentation attributes for vehicle 100. The set of presentation attributes for vehicle 100 corresponds to a virtual vehicle that is different from vehicle 100 and within the same vehicle category as vehicle 100. As explained above, the information pertaining to a particular virtual vehicle, including a set of presentation attributes, may be termed a virtual-vehicle profile. In one embodiment, a user first selects a virtual-vehicle profile such as "Ford Mustang" and then configures other parameters (e.g., model year, color(s), special edition, sound(s), etc.) within the selected virtual-vehicle profile.

A variety of different embodiments based on method 600 are possible in which some or all of the features discussed above are combined in various ways with at least blocks 610 and 620 in FIG. 6.

Figure 7:
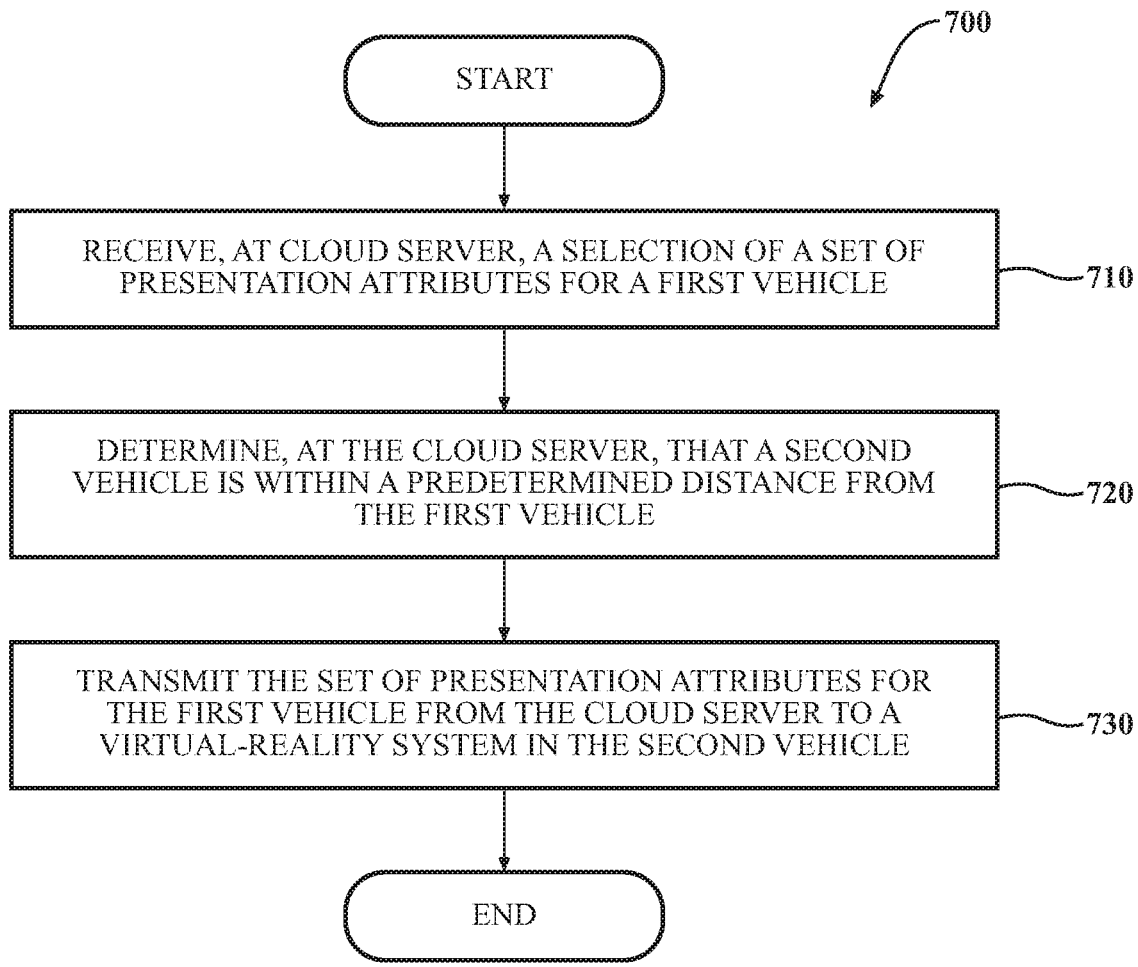
FIG. 7 is a flowchart of a method of presenting virtual-reality information in a vehicular environment, in accordance with another illustrative embodiment of the invention.

FIG. 7 is a flowchart of a method 700 of presenting virtual-reality information in a vehicular environment, in accordance with another illustrative embodiment of the invention. Method 700 will be discussed from the perspective of cloud server 185 (see FIGS. 1-4). While method 700 is discussed in combination with cloud server 185, it should be appreciated that method 700 is not limited to being implemented within cloud server 185, but cloud server 185 is instead one example of a system that may implement method 700.

At block 710, cloud server 185 receives a user's selection of a set of presentation attributes for a vehicle 100, the set of presentation attributes for vehicle 100 corresponding to a virtual vehicle that is different from vehicle 100 and within the same vehicle category as vehicle 100. As discussed above, cloud server 185 can receive the selection of the set of presentation attributes from a user device 195 that is running a user-interface application or that communicates with a Web-based user-interface application hosted by cloud server 185. The user's selection of the set of presentation attributes can be connected with the user choosing a virtual-vehicle profile for vehicle 100, as discussed above. In other embodiments, cloud server 185 can receive the user's selection of the set of presentation attributes from the VR system 170 of vehicle 100. In that embodiment, the user first interacts with user interface module 220 to select a virtual-vehicle profile with its associated set of presentation attributes, and communication module 240 uploads the user's selection to cloud server 185.

At block 720, cloud server 185 determines that another vehicle is within a predetermined distance from vehicle 100. As discussed above, cloud server 185 can make this determination based on frequently received reports from the vehicles traveling in a particular area. Such reports can include, e.g., GPS coordinates, heading, etc.

At block 730, cloud server 185 transmits the set of presentation attributes for vehicle 100 to a VR system 170 in the other vehicle that presents to an occupant of the other vehicle, in a VR space, vehicle 100 in accordance with the set of presentation attributes for the vehicle 100.

The embodiments described herein create the opportunity for a variety of new business models. In one embodiment, a vehicle owner pays extra for a virtual-vehicle profile issued as a "limited edition" with an associated rarity. In another embodiment, a vehicle owner can add custom advertising content to a virtual-vehicle profile (e.g., a business name, logo, and/or slogan on the virtual vehicle's doors) to promote a family business. In yet another embodiment, a company pays or in some other way compensates a vehicle owner for allowing the company to include its advertising content (e.g., a logo of a well-known brand) in a user's selected virtual-vehicle profile. Such an offer can be presented to the user while the user is in a user-interface application selecting and configuring the presentation attributes of a virtual-vehicle profile for a vehicle.

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with ORUs, or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and/or orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110 and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module (s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-7, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for presenting virtual-reality information in a vehicular environment, the system comprising:
a virtual-reality display apparatus;
one or more processors; and
a memory communicably coupled to the one or more processors and storing:
a communication module including instructions that when executed by the one or more processors cause the one or more processors to receive, at a first vehicle, a set of presentation attributes for a second vehicle that is in an external environment of the first vehicle, the set of presentation attributes for the second vehicle corresponding to a virtual vehicle that is different from the second vehicle and within a same vehicle category as the second vehicle, wherein the same vehicle category is one of automobiles, watercrafts, and aerial vehicles and the virtual vehicle differs from the second vehicle in at least one of a model year, a make, a model, one or more colors, a custom logo, custom detailing, one or more advertising messages, and one or more sounds; and a scene virtualization module including instructions that when executed by the one or more processors cause the one or more processors to present to an occupant of the first vehicle, via the virtual-reality display apparatus in a virtual-reality space, the second vehicle in accordance with the received set of presentation attributes for the second vehicle while the second vehicle is visible from the first vehicle in the external environment of the first vehicle.

2. The system of claim 1, wherein the set of presentation attributes for the second vehicle is selected by a person associated with the second vehicle.

3. The system of claim 1, wherein the communication module includes instructions to receive the set of presentation attributes for the second vehicle from one of a cloud server and the second vehicle.

4. The system of claim 1, wherein the scene virtualization module includes further instructions to present, to the occupant of the first vehicle, in the virtual-reality space, a virtual interior passenger compartment of the first vehicle.

5. The system of claim 4, wherein the virtual interior passenger compartment of the first vehicle includes at least one virtual occupant of the first vehicle.

6. The system of claim 1, wherein the scene virtualization module includes further instructions to present to the occupant of the first vehicle, in the virtual-reality space, at least one additional virtual element in the external environment of the first vehicle besides the second vehicle, as presented in accordance with the received set of presentation attributes for the second vehicle.

7. The system of claim 1, further comprising a user interface module including instructions that when executed by the one or more processors cause the one or more processors to receive, from a person associated with the first vehicle, a selection of a set of presentation attributes for the first vehicle, the set of presentation attributes for the first vehicle corresponding to another virtual vehicle that is different from the first vehicle and within a same vehicle category as the first vehicle.

8. The system of claim 1, wherein the occupant of the first vehicle is an operator of the first vehicle.

9. A method of presenting virtual-reality information in a vehicular environment, the method comprising:
receiving, at a first vehicle, a set of presentation attributes for a second vehicle that is in an external environment of the first vehicle, the set of presentation attributes for the second vehicle corresponding to a virtual vehicle that is different from the second vehicle and within a same vehicle category as the second vehicle, wherein the same vehicle category is one of automobiles, watercrafts, and aerial vehicles and the virtual vehicle differs from the second vehicle in at least one of a model year, a make, a model, one or more colors, a custom logo, custom detailing, one or more advertising messages, and one or more sounds; and
presenting to an occupant of the first vehicle, in a virtual-reality space, the second vehicle in accordance with the received set of presentation attributes for the second vehicle while the second vehicle is visible from the first vehicle in the external environment of the first vehicle.

10. The method of claim 9, wherein the set of presentation attributes for the second vehicle is selected by a person associated with the second vehicle.

11. The method of claim 9, further comprising presenting to the occupant of the first vehicle, in the virtual-reality space, at least one additional virtual element in the external environment of the first vehicle besides the second vehicle, as presented in accordance with the received set of presentation attributes for the second vehicle.

12. The method of claim 9, further comprising presenting, to the occupant of the first vehicle, in the virtual-reality space, a virtual interior passenger compartment of the first vehicle.

13. The method of claim 9, further comprising overriding, in the virtual-reality space, at least a portion of the set of presentation attributes for the second vehicle in response to a command from the occupant of the first vehicle.

14. The method of claim 9, further comprising receiving, from a person associated with the first vehicle, a selection of a set of presentation attributes for the first vehicle, the set of presentation attributes for the first vehicle corresponding to another virtual vehicle that is different from the first vehicle and within a same vehicle category as the first vehicle.

15. The method of claim 9, further comprising:
receiving, at the second vehicle, a set of presentation attributes for the first vehicle, the set of presentation attributes for the first vehicle corresponding to another virtual vehicle that is different from the first vehicle and within a same vehicle category as the first vehicle; and
presenting to an occupant of the second vehicle, in the virtual-reality space, the first vehicle in accordance with the received set of presentation attributes for the first vehicle while the first vehicle is visible from the second vehicle in an external environment of the second vehicle.

16. A method of presenting virtual-reality information in a vehicular environment, the method comprising:
receiving, at a cloud server, a selection of a set of presentation attributes for a first vehicle, the set of presentation attributes for the first vehicle corresponding to a virtual vehicle that is different from the first vehicle and within a same vehicle category as the first vehicle, wherein the same vehicle category is one of automobiles, watercrafts, and aerial vehicles and the virtual vehicle differs from the first vehicle in at least one of a model year, a make, a model, one or more colors, a custom logo, custom detailing, one or more advertising messages, and one or more sounds;
determining, at the cloud server, that a second vehicle is within a predetermined distance from the first vehicle; and
transmitting the set of presentation attributes for the first vehicle from the cloud server to a virtual-reality system in the second vehicle that presents to an occupant of the second vehicle, in a virtual-reality space, the first vehicle in accordance with the set of presentation attributes for the first vehicle.

* * * * *